United States Patent Office 3,499,930
Patented Mar. 10, 1970

3,499,930
TERTIARY AMINE OXIDES
Reginald L. Wakeman, Philadelphia, Pa., and Zdzislaw J. Dudzinski, Hasbrouck Heights, N.J., assignors to Millmaster Onyx Corporation, New York, N.Y., a corporation of New York
No Drawing. Filed Aug. 12, 1965, Ser. No. 479,334
Int. Cl. C07c 93/04, 85/04; C11d 1/40
U.S. Cl. 260—584                 2 Claims

ABSTRACT OF THE DISCLOSURE

A tertiary amine oxide having the formula:

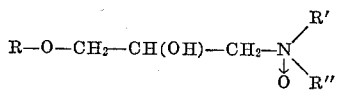

wherein R is selected from the group consisting of an alkyl and alkenyl radicals having 16 to 22 carbon atoms; R' and R" are selected from alkyl radicals having 1 to 4 carbon atoms; and wherein the oxygen atom is linked to the nitrogen by a semi-polar bond useful as detergents.

---

The present invention has for its object the preparation of oxides of tertiary amines which contain both an ether linkage and a hydroxyl group.

The products of this invention correspond to the general formula:

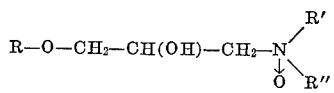

wherein R is an alkyl or alkenyl radical containing from 16 to 22 carbon atoms, R' and R" are alkyl radicals containing from 1 to 4 carbon atoms, wherein the oxygen atom is linked to nitrogen by means of a semi-polar bond.

In general, the amine oxides of this invention are produced by treating tertiary amines of the structure

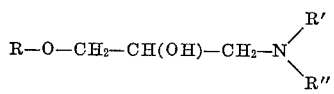

with a peroxide compound such, for example, as ozone, hydrogen peroxide, a peracid such as peracetic acid and the like, or Caro's acid (a solution of potassium persulfate in sulfuric acid). We prefer to use hydrogen peroxide for this purpose.

In general, the amines which are used for the purpose of our invention are prepared by first reacting an aliphatic alcohol containing from 16 to 22 carbon atoms with epichlorohydrin,

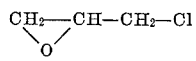

in the presence of a suitable catalyst such as a strong mineral acid like sulfuric acid or a Lewis acid such as zinc chloride, ferric chloride, aluminum chloride or boron trifluoride. We prefer to use as a catalyst boron trifluoride etherate. By this reaction, a 1-alkyl-2-hydroxy-3-chloropropane is formed according to the following reaction:

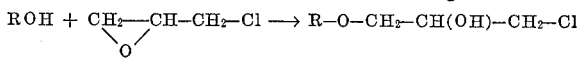

This reaction is readily effected at moderate temperatures ranging from 0° C. to reflux temperature, preferably within the range of 30° C. to 80° C.

The chlorohydroxyether thus formed is then reacted with a secondary amine such as dimethyl amine, diethyl amine, dipropyl amine or dibutyl amine. This reaction is carried out at temperatures ranging from 50° C. to 200° C., preferably between 90° C. and 150° C., and can be expressed by the following equation:

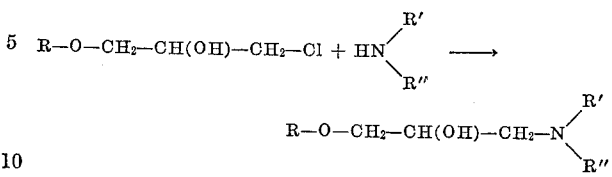

If desired, an acid acceptor such as sodium hydroxide, sodium bicarbonate, sodium carbonate or the corresponding potassium compounds may be used to facilitate reaction.

In carrying out the process of our present invention, the tertiary amines of the generalized formula given above are preferably reacted with hydrogen peroxide containing from 30% to 50% of hydrogen peroxide dissolved in water. The oxidation is carried out by stirring at slightly elevated temperatures until the reaction mixture becomes homogeneous. Although we prefer to use 30% to 50% hydrogen peroxide, we are not restricted thereby and may use any other desired concentration of this reagent. The temperature of oxidation is preferably between 40° C. and 70° C., although temperatures from about 20° C. to about 100° C. may be employed, if desired. As indicated above, ozone may be used alternatively, if desired. Moreover, where contamination of other organic materials is not a factor and where the contaminating materials may be of themselves beneficial, it is possible to carry out the preparation of these amine oxides by use of certain organic peroxides such, for example, as tertiary butyl hydroperoxide or cumene hydroperoxide. In some instances, peroxides of aliphatic or aromatic acids such as peracetic or perbenzoic acid may also be employed.

Further details of the invention are given in the following illustrative examples.

EXAMPLE 1

945 grams of a 95% grade of stearyl alcohol was charged into a flask equipped with a mechanical agitator, a reflux condenser and a dropping funnel. 50 grams of epichlorohydrin and 3 grams of boron trifluoride etherate were added, and the mixture was agitated and warmed to 40° C. to 50° C., after which epichlorohydrin amounting to 325 grams more was added during a period of about two hours. It was necessary to cool the flask to maintain this temperature range since the reaction is exothermic.

After all the epichlorohydrin had been added, the reaction mixture was maintained at 45° C. to 50° C. for four hours longer, or until the reaction was essentially complete. At this point, the temperature was gradually raised to 70° C. and held for twenty minutes longer while drawing a vacuum of 25", thus stripping off the catalyst.

1,315 grams of 1-stearoxy-2-hydroxy-3-chloropropane was obtained, or 99.5% of the theoretical yield. Its chlorine content was 10.35%, the theoretical being 9.45%.

EXAMPLE 2

By the procedure of Example 1, the following 1-alkoxy-2-hydroxy-3-chloropropane derivatives were prepared:

| Product: | Fatty alcohol source |
|---|---|
| 1-cetoxy | 95% cetyl alcohol. |
| 1-octadecenoxy | [1] Ocenol. |
| 1-cetoxy-stearoxy | [2] Adol 63. |
| 1-arachidoxy-behenoxy | [3] Alfol 2022. |

[1] Technical oleyl alcohol.
[2] Straight chain saturated fatty alcohols $C_{16}$–$C_{18}$.
[3] Straight chain saturated fatty alcohols $C_{20}$–$C_{22}$.

EXAMPLE 3

750 grams of the 1-stearoxy-2-hydroxy-3-chloropropane of Example 1 was charged into a stainless steel autoclave along with 1,020 grams of a 25 weight percent solution of dimethyl amine in isopropanol. The mixture was heated under pressure and with agitation for three hours at 145° C.

The solution was cooled to room temperature and transferred to a separatory funnel. 272 grams of 30% aqueous solution of sodium hydroxide was added to liberate the resulting 1-stearoxy-2-hydroxy-3-dimethylaminopropane from its hydrochloride. The oily layer was separated and washed with 300 grams of 20% sodium chloride solution. The amine was heated in vacuo to remove residual amounts of isopropanol and dimethyl amine, and then cooled and dried by treatment with anhydrous sodium sulfate.

720 grams or 94% of the calculated yield of 1-stearoxy-2-hydroxy-3-dimethylaminopropane was obtained. Its equivalent weight by titration with acid was 410, the theoretical value being 383.

The product dissolved clear in dilute acetic acid.

EXAMPLE 4

Following the procedure of Example 3, the corresponding 1-alkoxy-2-hydroxy-3-dimethylaminopropane derivatives were prepared from the respective 1-alkoxy-2-hydroxy-3-chloropropane derivatives of Example II.

Yields and quality were comparable in each case to those of Example 3.

EXAMPLE 5

A three-necked flask equipped with an agitator, a reflux condenser and a dropping funnel was charged with 230 grams of the 1-stearoxy-2-hydroxy-3-dimethylaminopropane of Example 3 along with 300 grams of water and heated to 50° C. 95 grams of 35% hydrogen peroxide was charged into the dropping funnel.

At 50° C. to 60° C., the hydrogen peroxide was added dropwise over a period of seven hours. After the first half hour, the mixture became viscous and threatened to gel; water was added at intervals to keep the reaction mass fluid until 350 grams more of water had been added. To liquify the mass further, 100 grams of isopropanol was added. When the reaction was complete, the product was clear and readily soluble in water. It assayed 20% as 1-stearoxy-2-hydroxy-3-dimethylaminopropane-N-oxide.

EXAMPLE 6

197 grams of the 1-stearoxy-2-hydroxy-3-dimethylaminopropane of Example 3 in 60 grams of isopropanol was reacted with 70 grams of 35% hydrogen peroxide added dropwise at 50° C. to 60° C. during four hours in the apparatus of Example 5. Upon completion of the reaction, the product assayed 61% as 1-stearoxy-2-hydroxy-3-dimethylaminopropane-N oxide.

EXAMPLE 7

In the same manner as in Example 6, amine oxides were prepared from the respective 1-alkoxy-2-hydroxy-3-dimethylaminopropane derivatives of Example 4.

EXAMPLE 8

Detergent formulations were prepared, employing certain of the amine oxides described above, with alkyl benzene sulfonate. These preparations were tested for foam stability at a concentration of 1% of total activity of both ingredients.

The foam testing procedure was as follows:

100 ml. glass-stoppered graduated cylinders were charged with 5 mm. diameter glass beads to the 10 ml. mark. 10 ml. of the diluted detergent formulae was added, bringing the meniscus to the 16 ml. mark. The stoppered cylinders were shaken back and forth strongly through an arc of about 120° at half-arm's length for twelve cycles. The depth of foam was read at once and at intervals over a period of one hour.

The formulations contained:

Amine oxide (100% basis) _____ 5.0
Ultrawet 35 KX (100% basis) _____ 16.0
Water to make _____ 100.0

Ultrawet 35 KX, an alkyl benzene sodium sulfonate, was considered to be 32% active; hence, 50 parts was taken. The amine oxides were similarly taken in quantity to yield 5% of active components in the formula. The test dilutions were therefore 1:21.

FOAM STABILITY OF 1% ACTIVE DETERGENT

| Ex. No. | Alkoxy | Volume of Foam in ml. after— | | | |
|---|---|---|---|---|---|
| | | 0 Min. | 1 Min. | 5 Min. | 30 Min. |
| 6 | Stearoxy | 55 | 54 | 53 | 25 |
| 7 | Cetoxy | 43 | 43 | 42 | 16 |
| 7 | Cetoxy-stearoxy | 50 | 48 | 47 | 20 |
| 7 | Arachidoxy-behenoxy | 53 | 53 | 51 | 20 |
| 7 | Octadecenoxy | 70 | 70 | 55 | 30 |

EXAMPLE 9

The formulations of Example 8 were modified as follows:

Amine oxide (100% basis) _____ 5.0
Ultrawet 35 KX (100% basis) _____ 16.0
Superamide GR [1] _____ 5.0
Ethyl alcohol _____ 8.0
Water to make _____ 100.0

[1] A coconut fatty acid diethanolamine condensate.

These compositions were tested as dishwashing compounds by a panel of ten members, who compared their performance with that of commercially obtainable liquid dishwashing compounds in use at home. The consensus rated the above formulation as "Good." The emollient effect was especially noted by seven of the ten.

EXAMPLE 10

Amine oxide (100% basis) _____ 3.0
Maprofix NH [1] (100% basis) _____ 12.0
Water to make _____ 100.0

[1] 30% active ammonium lauryl sulfate.

This mixture was buffered to a pH of 6.5.

The amine oxides were a mixture consisting in part of such simple tertiary amine oxides as lauryl dimethyl, myristyl dimethyl and cetyl dimethyl amine oxides, and in part of the products of Example 7.

These made excellent shampoo formulations with antistatic properties; they were clear, stable and of excellent foaming quality. The products of Example 7 served to add conditioning qualities.

The amine oxides described above have valuable surface-active properties, which are enhanced over those of the amine oxides of simpler structure, by virtue of the hydroxyl group and the ether group they contain. They are more readily compatible with detergent materials such as alkaryl sulfonates, alkyl sulfate salts and the like, and form more stable solutions in the presence of inorganic salts such, for example, as are used as builders, and also in alkaline or acid solutions.

In their own right, they are effective wetting and dispersing agents and are active detergents, and may be so used as substitutes for soap and synthetic detergents. In combination with soap, they prevent or reduce the deposition of curd or scum which commonly results from precipitation of insoluble soaps of calcium and magnesium salts present in hard water.

In combination with synthetic detergents such, for example, as the very widely employed salts of alkyl benzene sulfonic acids, the salts of long-chain fatty alcohol sulfuric esters, the higher fatty acid condensates with sarcosine, taurine and the like, as well as detergents of the amphoteric type, they act synergistically to increase their deterging, wetting and dispersing effect.

In detergent mixtures such as dishwashing and laundering preparations, they impart a very desirable emollient effect on the hands, which are often sensitive to the drying effect upon the skin, which is characteristic of most of the synthetic detergents.

In laundering, they impart a pleasing hand to the fabrics which have been washed with detergent mixtures in which they are present as components.

They are effective emulsifying agents.

Their wetting properties render them valuable as levelling agents in dyeing, as well as in other phases of the processing of textiles and related materials such as paper, leather and the like.

They may be used effectively as textile softeners; this is especially the case with the higher molecular weight homologs such as the stearyl and behenyl derivatives.

They are further of use as detergent additives to solvents for dry-cleaning purposes.

We claim:

1. A tertiary amine oxide having the structure:

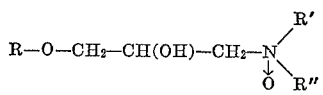

wherein R is a member of the group consisting of alkyl and alkenyl groups having from 20 to 22 carbon atoms, and R' and R" are each alkyls having 1 to 4 carbon atoms.

2. A product consisting of a mixture of two tertiary amine oxides, each having the structure:

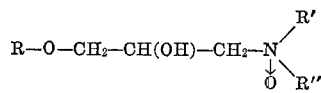

wherein the R—O of one of said tertiary amine oxides is a member of the group consisting of cetoxy and arachidoxy, and the R—O in the other of said tertiary amine oxides is a member of the group consisting of stearoxy and behenoxy, and wherein R' and R" are each alkyls having 1 to 4 carbon atoms.

References Cited

UNITED STATES PATENTS 3,202,714   8/1964   Zimmerer et al. _____ 260—584
3,441,611   4/1969   Drew et al. _____ 260—584

CHARLES B. PARKER, Primary Examiner

R. L. RAYMOND, Assistant Examiner

U.S. Cl. X.R.

252—137, 152; 260—583, 585